Patented Dec. 23, 1941

2,266,782

UNITED STATES PATENT OFFICE 2,266,782

VAT DYESTUFFS OF THE ANTHRAQUINONE SERIES

Ralph N. Lulek, Silverside Heights, Del., and Frederic B. Stilmar, Woodstown, N. J., assignors to E. I. du Pont de Nemours & Company, Wilmington, Del., a corporation of Delaware No Drawing. Application September 7, 1939, Serial No. 293,700

4 Claims. (Cl. 260—368)

This invention relates to the preparation of new and valuable vat dyestuffs of the anthraquinone series. The invention relates more particularly to the preparation of new vat dyestuffs which may be prepared by the condensation of trimesic acid chloride with at least two molecules of an aminoanthraquinone compound, the third acid group of the trimesic acid chloride being converted to an acid imide with ammonia, an alkyl amine, or an arylamino compound which may also be an aminoanthraquinone compound.

We have found that a new series of dyestuffs of the following general formula

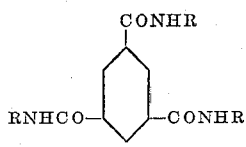

in which at least two of the R's stand for an aryl radical of the anthraquinone series which is attached to the nitrogen through an alpha carbon atom, and in which the third R stands for a radical of the class consisting of H or an alkyl or aryl radical of an organic amine, which dyestuffs dye in shades ranging from yellow, to red and blue, can be produced by condensing various amino anthraquinone compounds including the unsubstituted aminoanthraquinone with trimesic acid chloride. The shades of the dyestuffs may be varied by varying the number and kind of aminoanthraquinone derivatives which are condensed with the trimesic acid chloride. At least two moles of an aminoanthraquinone compound are employed per mole of trimesic acid chloride. Where only two moles of the aminoanthraquinone compound are used the third carboxylic acid radical is converted to an acid imide with ammonia, an alkylamine, such as methylamine, ethylamine, etc., or with an arylamine such as aniline, naphthylamine, etc.

The object of the invention is to prepare a new series of dyestuffs from trimesic acid chloride and aminoanthraquinone compounds which have the same general molecular constitution but which dye in a wide variety of shades and in general exhibit good fastness properties.

The compounds of this invention may be prepared by heating together in an organic solvent such as nitrobenzene, trichlorobenzene, etc., the trimesic acid chloride and the amino anthraquinone compound at temperatures preferably from 100 to 200° C. The dyestuffs are obtained directly in good yields and purity by filtering, washing with the solvent employed in the condensation and then with alcohol and drying. Alternatively, the produce may be freed from solvent by steam distillation. Where two different arylamines are employed the first amine is gradually added at the reaction temperature until the reaction is completed and then the second amine or ammonia is added.

The following examples are given to illustrate the invention although it is to be understood that they do not include all of the combinations contemplated. The parts used are by weight.

Example 1

6.6 parts of trimesic acid chloride, 25.8 parts of 1 - amino - 5 - benzoylaminoanthraquinone, and 250 parts of nitrobenzene are heated under agitation to 200–205° C., and the temperature maintained for 1 and ½ hour. The product in the form of yellow plates, is filtered off at 80° C., washed with nitrobenzene, freed from nitrobenzene by steam distillation and dried. It dissolves in concentrated sulfuric acid with a yellow-brown color, and dyes cotton from a redviolet vat in bright yellow shades of good fastness. The product has the formula:

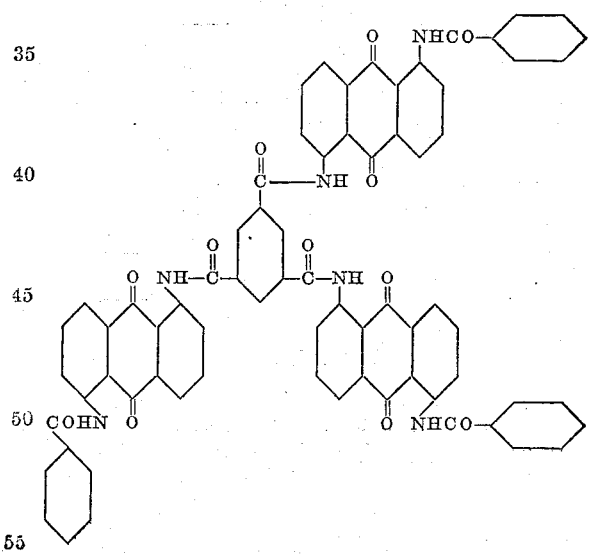

Example 2

8.8 parts of trimesic acid chloride, 25.7 parts of 1-amino-6-chloroanthraquinone and 250 parts of nitrobenzene are heated under agitation to 200–205° C. and held at that temperature for one hour. The product in the form of greenish yellow plates, is filtered off at 50° C., washed with nitrobenzene, benzene and alcohol in turn and dried. This dyestuff dyes cotton from a bluish-red vat in bright greenish yellow shades of good fastness. It dissolves in concentrated sulfuric acid with a yellow color and has the formula:

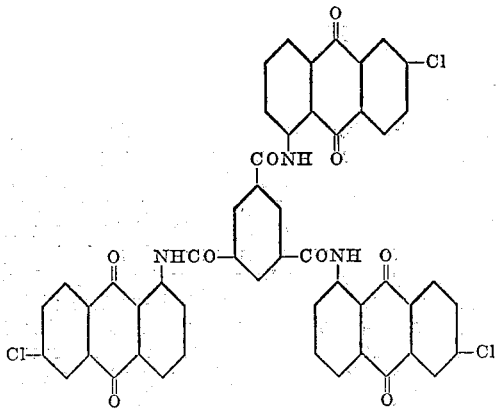

Example 3

8.8 parts of trimesic acid chloride and 300 parts of nitrobenzene are heated to 130–135° C. 22.8 parts (2 moles) of 1-amino-4-benzoylamino-anthraquinone are then added, over a period of an hour. The temperature is raised to 170° C. and then 10 parts of aniline are added. After heating for one hour at 200–205° C., the product is filtered off at 80°, washed with nitrobenzene, freed from nitrobenzene by steam distillation and dried.

The product dyes cotton in reddish shades from a reddish-violet vat. It dissolves in concentrated sulfuric acid with a red color, and has the formula:

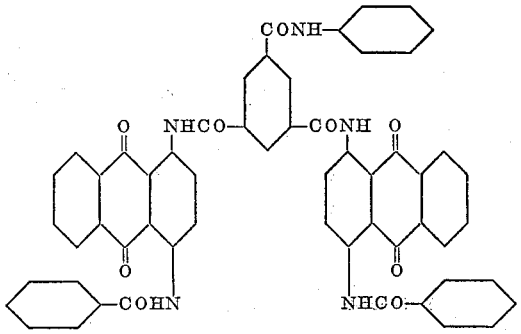

Example 4

8.8 parts of trimesic acid chloride and 460 parts of nitrobenzene are heated to 130–135° C. Over a period of one hour, 22.8 parts (2 moles) of 1-amino-5-benzoylaminoanthraquinone are added. The temperature is raised to 170° C. and then 10 parts of aniline are added. After heating for an hour at 200–205° C., the product, in the form of small needles is filtered off at 80° C., washed with a little nitrobenzene and steam distilled solvent free. The product dyes cotton in bright yellow shades from a reddish-violet vat. It dissolves in concentrated sulfuric acid with a yellow-brown color, and has the formula:

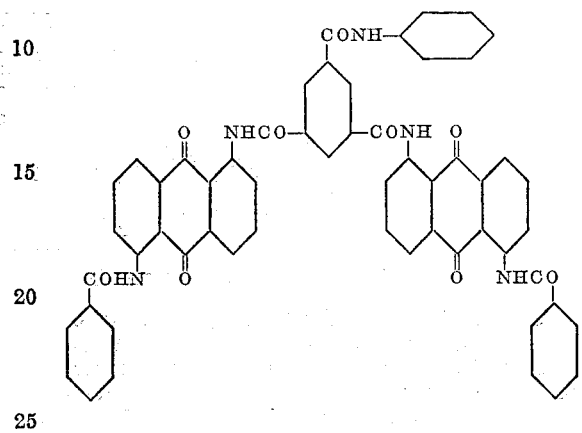

Example 5

8.8 parts of trimesic acid chloride, 300 parts of nitrobenzene are heated to 130–135° C. and then 22.8 parts (2 moles) of 1-amino-5-benzoyl-amino-anthraquinone are added over a period of one hour. The temperature is raised to 150° C. and 11.3 parts 4-amino-2:1-(N)-anthraquinone-benzacridone are added. After heating for an hour at 200–205° C. the product, in the form of yellowish-green plates, is filtered off at 80° C. and steam distilled free of solvent. The product dyes cotton in yellowish-green shades of excellent fastness from a violet-red vat. It dissolves in concentrated sulfuric acid with a brownish yellow coloration, and has the formula:

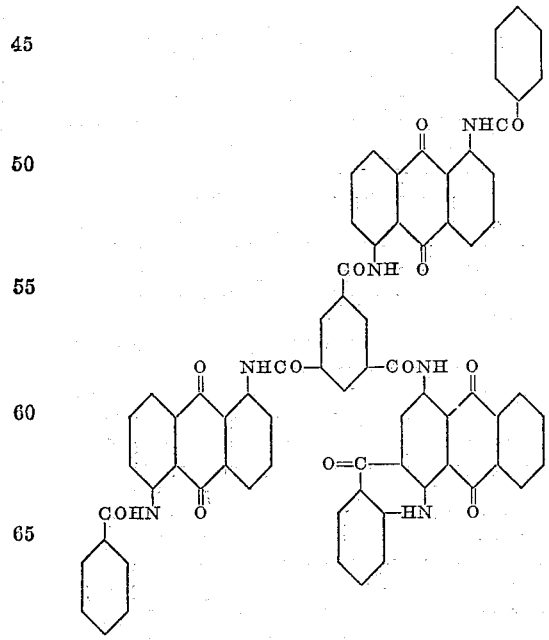

Example 6

8.8 parts of trimesic acid chloride and 300 parts of nitrobenzene are heated to 130–135° C. 14.8 parts (2 moles) of 1-aminoanthraquinone are added over a period of one hour. The temperature is raised to 170–175° C. and then 10 parts aniline are added. After heating for one hour at 200–205° C., the product is filtered off at 80° C. and washed with nitrobenzene, benzene and alcohol in turn. The product dissolves in concentrated sulfuric acid and dyes cotton in greenish-yellow shades from a bluish-red vat. It has the formula:

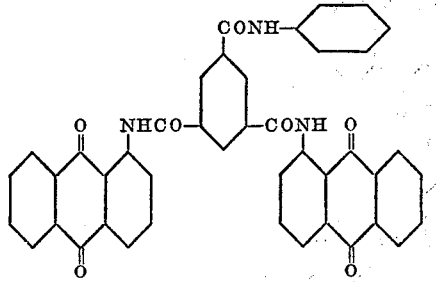

Example 7

8.8 parts of trimesic acid chloride and 400 parts of nitrobenzene are heated to 130–135° C. and then 22.7 parts of 4-amino-2:1-(N)-anthraquinone-benzacridone (2 moles) are added over a one hour period. After heating to 170° C., 8.3 parts of 1-amino-6-chloro-anthraquinone are added and the mass is heated at 200–205° C. for one hour. The product is filtered off at 80° and washed with nitrobenzene, benzene and alcohol in turn. The product dissolves in concentrated sulfuric acid with a brownish-yellow color and dyes cotton in fast blue-gray shades from a reddish-violet vat. It has the formula:

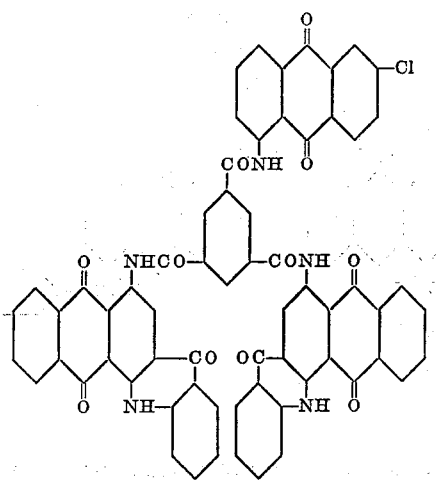

Example 8

8.8 parts of trimesic acid chloride and 300 parts of nitrobenzene are heated to 130–135° C., and 22.8 parts 1-amino-5-benzoylaminoanthraquinone are added over a one hour period. After heating to 160° C., 8.6 parts of 1-amino-6-chloro-anthraquinone are added and the mass is heated at 200–205° C. for one hour. The product is filtered at 80° and washed with nitrobenzene and then with alcohol.

The product dyes cotton from a reddish-violet vat in full bright yellow shades of excellent fastness. It dissolves in sulfuric acid with a brownish-yellow color, and has the formula:

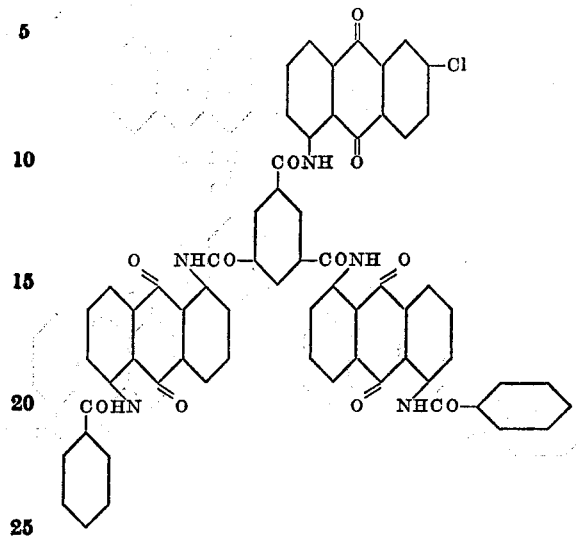

Example 9

8.8 parts of trimesic acid chloride and 300 parts of nitrobenzene are heated to 130–135° C. and 22.8 parts 1-amino-4-benzoylaminoanthraquinone are added over an hour period. The temperature is raised to 150° C. and 11.4 parts 1-amino-5-benzoylaminoanthraquinone are added. After heating to 200–205° C. for one hour, the product is filtered at 80° C. and washed with nitrobenzene, benzene and alcohol in turn. The product dissolves in concentrated sulfuric acid with a red color and dyes cotton in brownish-red shades from a reddish-violet vat. It has the formula:

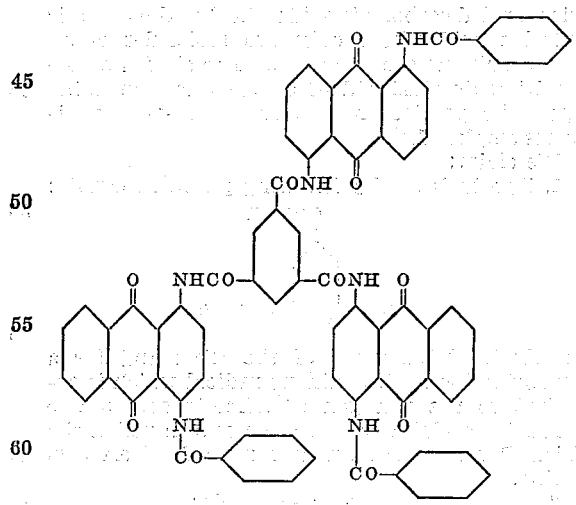

Example 10

8.8 parts of trimesic acid chloride and 300 parts of nitrobenzene are heated to 130–135° and 22.8 parts (2 moles) of 1-amino-5-benzoylaminoanthraquinone are added over a period of one hour. After heating to 150° C., 4 parts of 1:5-diamino-anthraquinone are added and the temperature is raised to 200–205° C. and held for one hour. After filtering off at 80°, the product was steamed free of solvent. The product dissolves in concentrated sulfuric acid with a yellow color and dyes cotton full yellow shades from a reddish-violet vat. It has the formula:

which dyes cotton from a reddish-violet vat in bright yellow shades and which dissolves in concentrated sulfuric acid with a yellow-brown color.

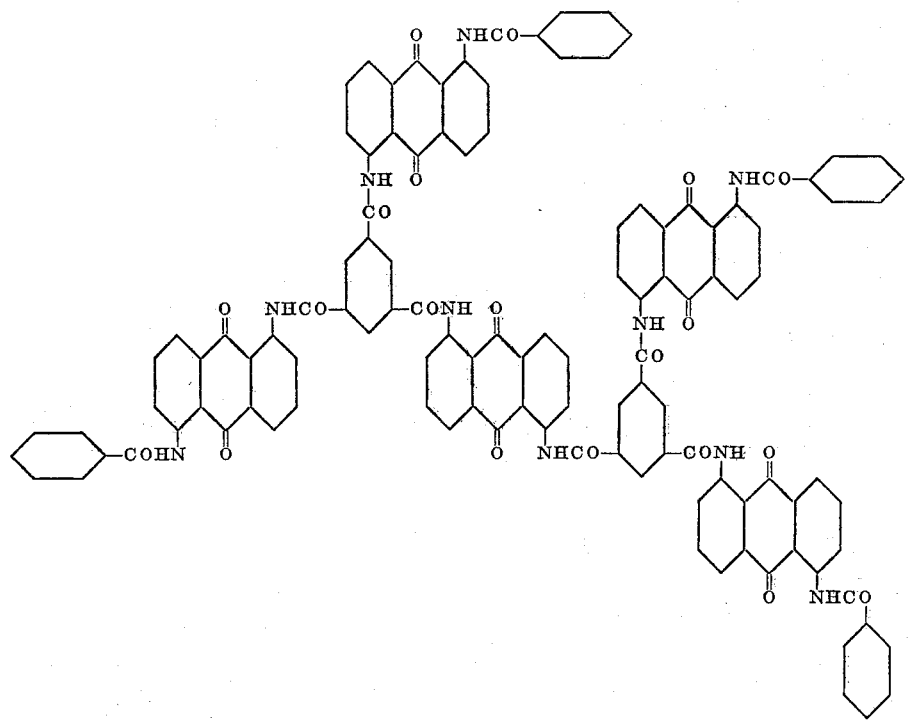

It is of course understood that the above examples are given merely to illustrate applicants' invention and that other aminoanthraquinone compounds such as, 5-aminoanthraquinone-2-1 (N)-benzacridone, 4-amino-anthraquinone-2:1 (S) thioxanthone; 1-amino-4, (or 5, or 8)-chloroanthraquinone, etc., may be substituted for those employed in the examples. Other substituted aliphatic or aromatic amines may be condensed with a third carboxylic acid radical of the trimesic chloride acid where only two molecules of an anthraquinone are employed. The shades of the resulting dyestuff will of course vary depending upon the particular type of amino-anthraquinones employed.

We claim:

1. Dyestuffs of the following general formula:

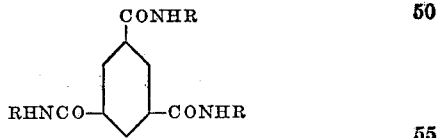

in which at least two of the R's stand for a benzoylamino anthraquinone radical which is attached to the nitrogen of trimesic acid amide through an alpha carbon atom and in which the third R stands for an aryl radical of an aryl amine.

2. The compound of the formula:

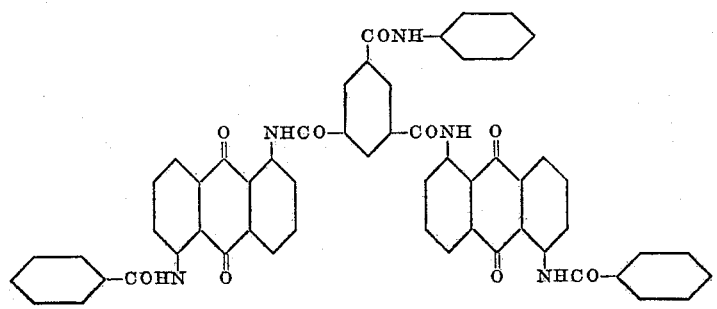

which dyes cotton from a reddish-violet vat in bright yellow shades and which dissolves in concentrated sulfuric acid with a yellow-brown color.

3. The compound of the formula:

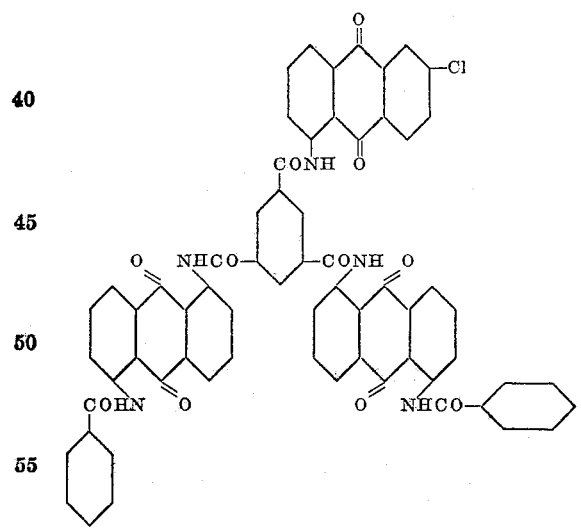

which dyes cotton from a reddish-violet vat in bright yellow shades, and which dissolves in sulfuric acid with a brownish-yellow color.

4. The compound of the formula:
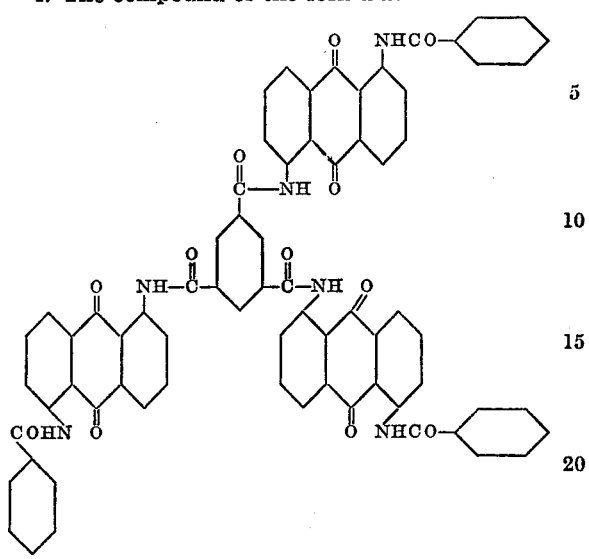
which dyes cotton from a red-violet vat in bright yellow shades, and which dissolves in concentrated sulfuric acid with a yellow-brown color.
RALPH N. LULEK.
FREDERIC B. STILMAR.